No. 785,984. PATENTED MAR. 28, 1905.
E. L. STALLINGS.
CONNECTION OR JOINT FOR WATER CLOSET BOWLS.
APPLICATION FILED APR. 7, 1904.
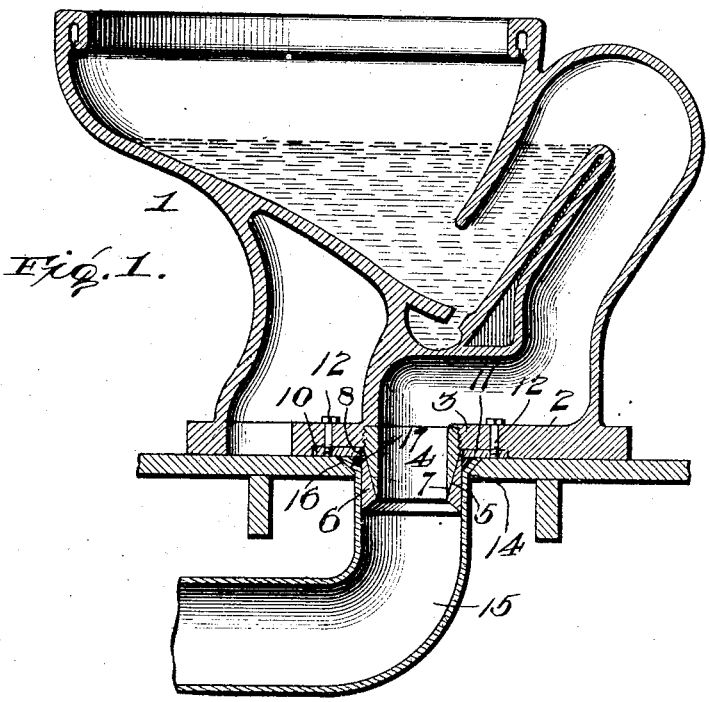
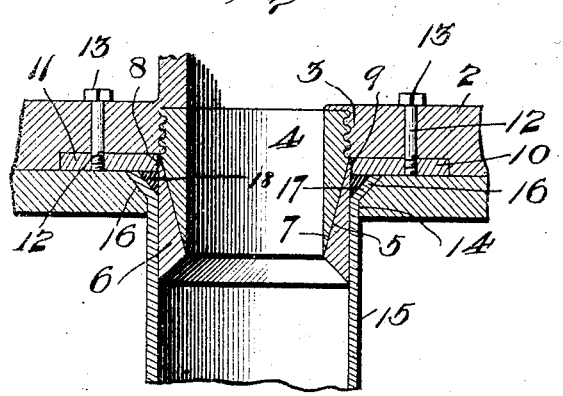
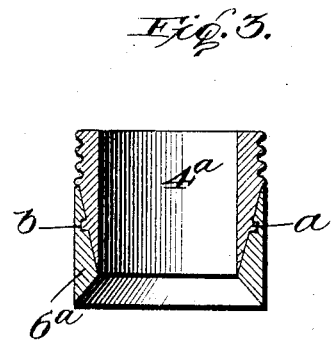
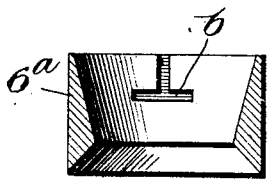
WITNESSES:
INVENTOR
Edgar L. Stallings
By Jas. L. Skidmore
His Attorney.

No. 785,984. Patented March 28, 1905.

UNITED STATES PATENT OFFICE.

EDGAR L. STALLINGS, OF COLUMBIA, SOUTH CAROLINA.

CONNECTION OR JOINT FOR WATER-CLOSET BOWLS.

SPECIFICATION forming part of Letters Patent No. 785,984, dated March 28, 1905.

Application filed April 7, 1904. Serial No. 201,959.

*To all whom it may concern:*

Be it known that I, EDGAR L. STALLINGS, a citizen of the United States, residing at Columbia, in the county of Richland and State of South Carolina, have invented new and useful Improvements in Connections or Joints for Water-Closet Bowls, of which the following is a specification.

My invention relates to connections or joints for water-closet bowls; and the objects of the same are to provide a reliable and durable joint for connecting the bowl with the waste-pipe which will effectively prevent the escape of sewer-gas and which will form a perfectly tight joint by means of a simple construction of comparatively few parts, which may be readily assembled and connected without special tools and by an unskilled workman. These objects are attained by means of the construction illustrated in the accompanying drawings, in which—

Figure 1 is a vertical section taken through a water-closet bowl provided with my improved joint or connection. Fig. 2 is a sectional view illustrating the joint and portions of the bowl and waste-pipe broken away. Fig. 3 is a vertical section of a slightly-modified joint or connection. Fig. 4 is a detail view illustrating the inner surface of one part of the joint shown in Fig. 3.

Like characters of reference designate like parts wherever they occur in the different views of the drawings.

The numeral 1 designates a water-closet bowl which may be of ordinary or any desired construction, and 2 is the base-flange thereof. Projecting below the base-flange 2 is a short tube or nipple 3, which is interiorly threaded to receive the threaded thimble or connection 4. This thimble 4 is fitted to the nipple 3 by means of the threads formed on each part, and the lower portion of the thimble is tapered from its outer to its inner surface, as shown, and the tapered surface 5 is ground smooth for a purpose which will presently appear.

A ring or short pipe-section 6 is fitted upon the tapered portion of the thimble 4, said ring being tapered upon its inner surface 7 from its lower end toward the top, the surface 7 being also ground smooth to fit upon the ground surface 5 of the thimble 4 and to form a gas and liquid tight joint between said parts. At the upper end of the ring or pipe-section 6 a series of exterior screw-threads 8 are formed thereon to engage the threads 9, formed on the inner edge of a ring or annulus 10, seated in a recess 11 under the base-flange 2 of the closet-bowl and surrounding the tube or nipple 3. A series of bolts 12 are secured to the ring or annulus 10, and these bolts extend through holes in the base-flange 2 of the bowl, the heads 13 being turned to hold the bowl firmly in place and to form a rigid connection with the waste-pipe. A hole 14 is formed in the floor of sufficient size to admit the upper end of the waste-pipe 15, and the upper edge of the hole 14 is beveled, as at 16, to form a seat for the outwardly-flaring upper end 17 of the waste-pipe 15. The lower end of the ring or short pipe-section 6 fits snugly within the upper end of the waste-pipe, and a quantity of solder 18 is poured in around the ring 6 in the recess formed by the flaring upper end of the waste-pipe. The waste-pipe 15 is thus firmly connected to the ring 6 by a gas-tight joint, and the bowl may now be removed for repairs or renewal by turning the bowl and the ring 10 to unscrew said parts from the thimble 4 and the pipe-section 6.

In Figs. 3 and 4 I have illustrated a modification in which the thimble 4ª is secured to a short pipe-section 6ª by means of lugs *a* engaging T-shaped recesses *b* in the tapered interior surface of the pipe-section 6ª. This construction is designed to be used in lieu of the ring 10 and the bolts 12.

From the foregoing it will be observed that my pipe connection is simple in construction, can be easily and quickly put together, and forms a tight and reliable joint which can be readily detached for repairs or renewals.

Having thus described my invention, what I claim is—

1. A waste-pipe connection for water-closet bowls, comprising a bowl having an integral base portion, a threaded flange formed in said integral base, a threaded thimble engaging the screw-threads on the integral base, said thimble having a tapered and ground surface, a threaded ring fitted in a recess in the under side of the base, a threaded pipe-section having a tapered or ground surface to fit upon the thimble, and means for connecting the upper end of the waste-pipe to the ring and for attaching the bowl to said ring.

2. In a water-closet connection, a threaded thimble connected to the bowl and having a tapered lower end provided with a smoothly-ground surface, a short pipe-section having a reversely-tapered surface ground to fit upon the thimble, a waste-pipe fitted upon the short pipe-section and secured in place by solder, substantially as described.

3. In a water-closet connection, a threaded thimble connected to the bowl and provided with a tapered lower end, a short pipe-section having a tapered upper end fitted upon the thimble, a waste-pipe fitted to said short pipe-section and provided with an outwardly-flaring upper end, forming a recess between the short pipe-section and the waste-pipe, and solder in the recess to unite said parts and form a tight joint.

4. A waste-pipe connection for water-closets, comprising a threaded thimble secured to the bowl and provided with a tapered lower end, a short pipe-section fitted to said thimble by a tapered upper end and a bayonet-joint, and a waste-pipe connected to the short pipe-section by a solder joint.

5. In a water-closet connection, a threaded thimble connected to a water-closet bowl and provided with a tapered lower end, a short pipe-section provided with a tapered upper end and fitted to the thimble, a waste-pipe soldered to the short pipe-section, a ring seated in a recess in the base-flange of the bowl and connected by screw-threads to the short pipe-section, and a series of bolts for connecting the bowl-flange to the ring or annulus, substantially as described.

In testimony whereof I have signed my name to this specification in the presence of two subscribing witnesses.

EDGAR L. STALLINGS.

Witnesses:
 AUG. M. DEAL,
 D. C. RAY.